United States Patent [19]

King et al.

[11] Patent Number: 5,175,557
[45] Date of Patent: Dec. 29, 1992

[54] TWO CHANNEL GLOBAL POSITIONING SYSTEM RECEIVER

[75] Inventors: Thomas M. King, Tempe; Howard L. Kennedy, Phoenix, both of Ariz.

[73] Assignee: Motorola, Inc., Schaumburg, Ill.

[21] Appl. No.: 732,378

[22] Filed: Jul. 18, 1991

[51] Int. Cl.⁵ .......................... G01S 5/02; H04B 7/185; H04B 15/00
[52] U.S. Cl. ........................................ 342/357; 375/1
[58] Field of Search ............... 342/354, 356, 357, 96, 342/423, 434, 352; 375/1

[56] References Cited

U.S. PATENT DOCUMENTS

| | | | |
|---|---|---|---|
| 3,728,485 | 4/1973 | Osborne et al. | 375/111 |
| 4,545,075 | 10/1985 | Miller et al. | 455/3 |
| 4,578,678 | 3/1986 | Hurd | 342/357 |
| 4,785,463 | 11/1988 | Janc et al. | 375/1 |
| 4,841,544 | 6/1989 | Nuytkens | 375/1 |
| 4,894,842 | 1/1990 | Broekhoven et al. | 375/1 |
| 5,036,329 | 7/1991 | Ando | 342/357 |

OTHER PUBLICATIONS

Hurn, "GPS A Guide to the Next Utility", Trimble Navigation. Selecting a GPS receiver pp. 62–69.

Primary Examiner—Gregory C. Issing
Attorney, Agent, or Firm—Frank J. Bogacz

[57] ABSTRACT

A method and apparatus for operating a two channel digital global positioning system receiver for receiving coded satellite signals from each of a plurality of satellites, where the signals exhibit Doppler shifts. The method comprises the steps of continuously tracking of a particular one of the satellites for receiving information included in the coded satellite signals by one channel of the receiver, and sequentially tracking of each of the plurality of satellites, except the one particular satellite, by the other channel of the receiver for receiving information included in the coded satellite signals.

22 Claims, 6 Drawing Sheets

TWO CHANNEL GLOBAL POSITIONING SYSTEM RECEIVER

CROSS REFERENCE TO RELATED APPLICATIONS

This application is related to co-pending application U.S. Pat. Application Ser. No. 636,168, now U.S. Pat. No. 5,148,452 and Ser. No. 07/724,261, which are assigned to the same assignee as the present invention.

BACKGROUND OF THE INVENTION

The present invention relates to global positioning system receivers and more particularly to continuous and sequential tracking global positioning system receivers.

The global positioning system includes a constellation of satellites transmitting navigation information via radio signals. Time and position may be calculated by receivers which receive and process these radio signals. The constellation of GPS satellites broadcast two binary phase shift keying (BPSK) modulated signals at L-band.

The first, L1, is at 1575.42 megaHertz and the second, L2, is at 1227.6 megaHertz. The modulated signals include pseudorandom noise (PN) codes and data. The L1 signal carrier is modulated in quadrature with both a clear acquisition, or CA, code, and a precise, or P, code. The CA code chipping rate is 1.023 megaHertz and that of the P code is 10.23 megaHertz. The L2 frequency is normally modulated with only the P code. The modulation on the L1 and L2 signals is contained in a frame which is 1500 bits long and having thirty seconds duration.

It is necessary to track at least four GPS satellites in order to compute the three dimensional position of a GPS receiver and the time. One method, termed continuous tracking, is to dedicate a receiver channel to track a given satellite. A group of four or more such channels operate in parallel, providing data from at least four satellites, allowing unique determination of positional data.

Another method of tracking four satellites with fewer than four reception channels requires time-sharing receiver channels among the satellite signals. Two primary types of time multiplexing arrangements are common, known as satellite multiplex and satellite sequencing receivers.

Satellite multiplex receivers typically use a single hardware channel which is switched between four or more satellite signals, providing a very simple receiver architecture. These signals are multiplexed at a rate such that signals from all observed satellites are observed in a single satellite signal data bit time of 20 milliseconds. In this type of arrangement, multiplexing rates are faster than the loop bandwidth. A reduction in signal-to-noise ratio occurs because each satellite is observed for less than the receiver loop settling time.

Satellite sequencing receivers slowly switch between multiple satellite signals at a rate substantially slower than the loop bandwidth but which does not allow decoding of the 50 BPS data message. No reduction in signal to noise ratio is incurred at this slower switching rate, providing a clear advantage without incurring any sacrifice in the form of additional hardware complexity.

Sequencing and multiplexing receivers are thus forced to adopt bimodal operation wherein range measurements and data collection are performed at separate times. Multiple ranging measurements needed to compute position are not possible during the data collection interval. Both sequencing and multiplex receivers can operate with as few as a single channel, but without providing continuous monitoring of either positional data or satellite data.

Data loss may result during lockup or synchronization to a particular satellite signal in the course of the sequencing process. Accordingly, such operations require receiver circuitry which may be set up rapidly by control circuitry when time-sharing operations cause switching from one satellite signal to another. In addition, high Doppler frequencies require high-speed logic to process information more rapidly.

In order to produce low-cost, flexible GPS receivers, sequencing mode operation using few receiver channels is desired. Prior art receivers operate in the continuous tracking mode, requiring four or more channels, or in the sequencing or multiplexing modes, with attendant sacrifices in current satellite data and signal-to-noise ratio. Prior art GPS receivers do not provide needed flexibility and hence desired low-cost features.

Another shortcoming of the prior art is the inability to provide a low-cost integrated circuit chip set embodying circuitry of the requisite speed to handle a number of channels for sequencing or continuous tracking mode operations. Typically such circuitry requires several integrated circuits and discrete components matched for signal delay and phase shift.

Accordingly, it is extremely desirable to be able to provide multi-channel GPS receivers, having as few channels as possible, having high operating and switching speed, using as few parts as possible to provide the highest signal to noise ratio achievable, and at low cost.

SUMMARY OF THE INVENTION

According to the present invention, a novel two channel GPS receiver employing digital techniques is shown. These techniques include a method for operating a two channel digital global positioning system receiver for receiving a pair of coded satellite signals from a plurality of satellites. The signals exhibit Doppler shifting due to the rapid motion of the satellites about the earth.

The method comprises the steps of continuously tracking by a first channel of the receiver a particular one of the satellites for receiving information included in the coded satellite signals, and sequentially tracking by a second channel of the receiver each of the plurality of satellites, except the one particular satellite, for receiving information included in the coded satellite signals.

The apparatus comprises a two channel digital global positioning system receiver for receiving coded satellite signals from each of a selected plurality of satellites comprising a first receiver channel for continuously tracking a particular one of the plurality of satellites for receiving and decoding the coded satellite signals, and a second receiver channel for sequentially tracking each of the plurality of satellite, except the one particular satellite, the second receiver channel for receiving information from the plurality of coded satellite signals except for the coded satellite signal of the one particular satellite.

The above and other features and advantages of the present invention will be better understood from the following detailed description taken in conjunction with the accompanying drawings.

DETAILED DESCRIPTION OF THE PREFERRED EMBODIMENT

As used herein, the symbols "I" and "Q" refer to inphase and quadrature real representations of components of a complex signal, or to signal processing elements operating on these components, with I/Q referring to an the full real representation of that complex signal or signal processing element. The terms "channel" and "digital decimator correlator" are used interchangeably herein to refer to digital signal processing networks for signal recognition.

Figure 1:
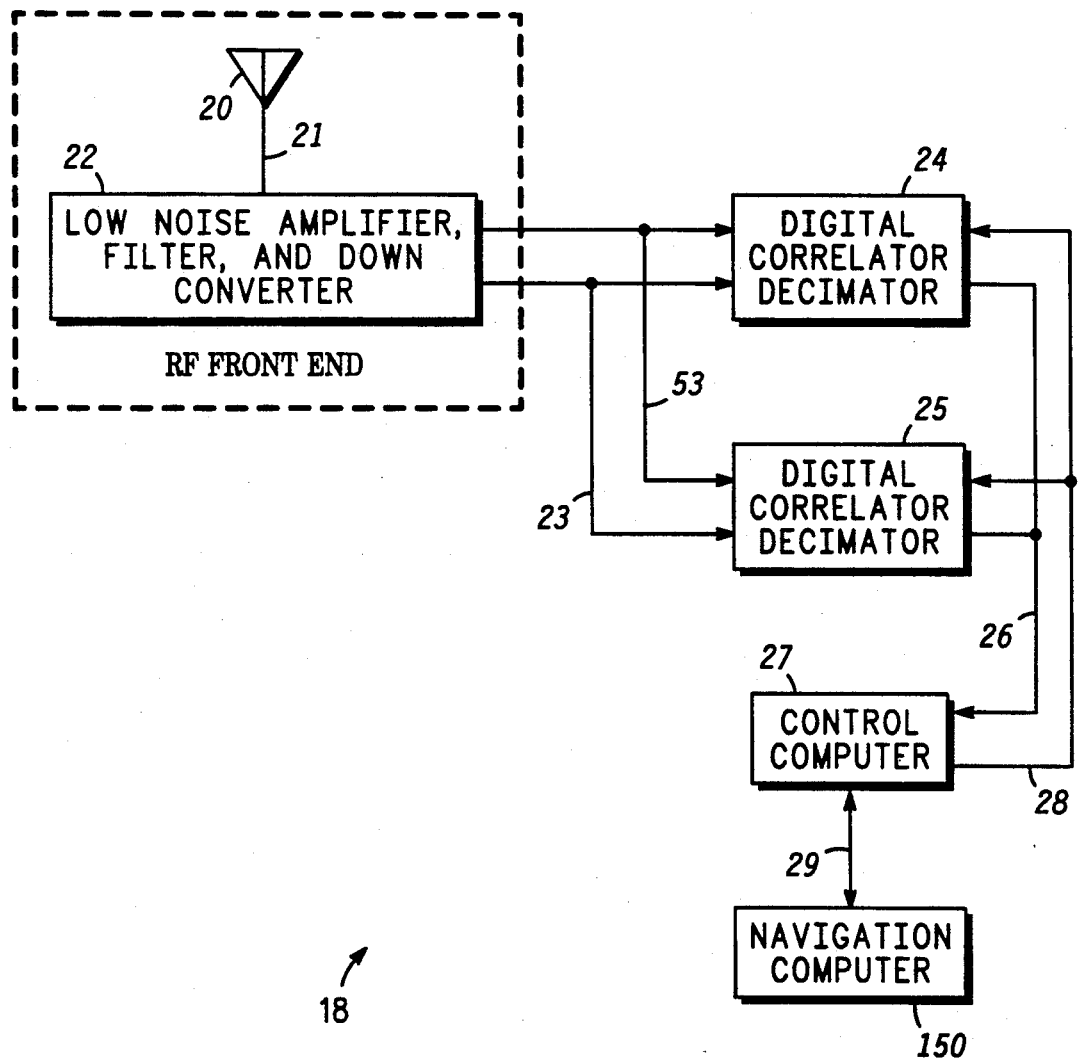
FIG. 1 is an overall block diagram of a GPS receiver in accordance with the principles of the present invention.

FIG. 1 illustrates primary functional blocks of GPS receiver 18 as implemented in accordance with the present invention. Shown in FIG. 1 are antenna 20, antenna input leads 21, low noise amplifier, filter and down converter 22, busses 53, 23, 28, 26, and 29, digital correlator decimators 24, 25, control computer 27, and navigation computer 150. Antenna 20 is suitable for receiving L-band (L1) signals broadcast by the GPS satellites.

Figure 2:
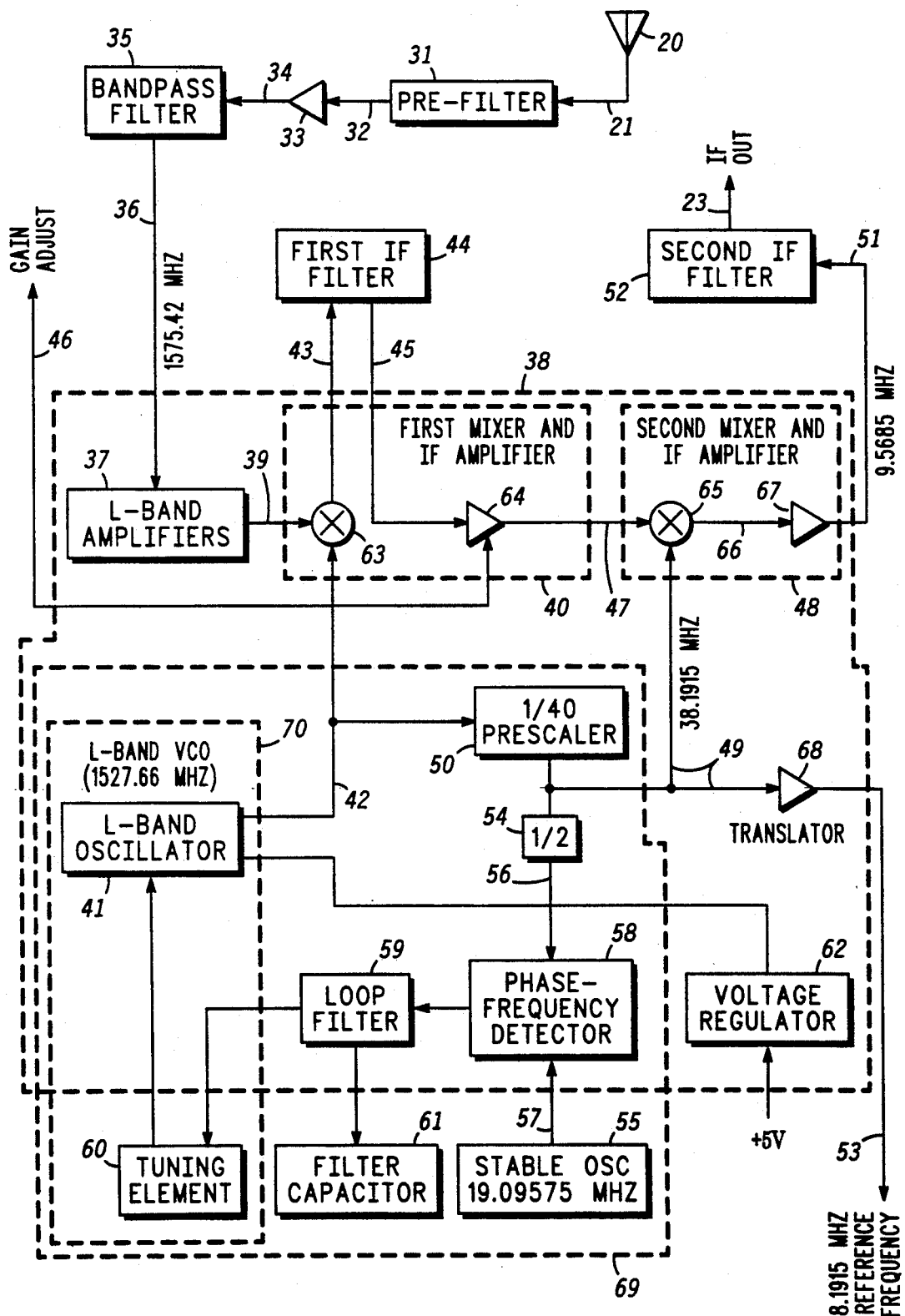
FIG. 2 is a detailed block diagram of the GPS receiver of FIG. 1.

The present embodiment uses a microstrip "patch" antenna having essentially hemispherical coverage and right hand circular polarization. Antenna output terminals 21 are connected to low noise amplifier, filter and down converter 22. Details of the preferred embodiment of low noise amplifier, filter and down converter 22 are shown in FIG. 2. Referring again to FIG. 1, the output of low noise amplifier, filter and down converter 22 is an intermediate frequency (IF) signal on buss 23 containing frequency translated satellite signals.

IF signal on buss 23 is connected to digital correlator decimators 24, 25. Digital correlator decimators 24, 25 have decimated outputs on buss 26. A single A/D converter 71 is employed, simplifying receiver 18 architecture.

All of the uncorrelated satellite signals are present in IF signal on buss 23, therefore they are all sampled simultaneously, freeing receiver 18 of FIG. 1 from inter-channel biases and need for duplication of A/D circuit 71.

Decimated outputs on buss 26 include correlated filtered outputs of the digital signal processing circuits. Filtered signals present on buss 26 have a nominal output rate of one kiloHertz, which is sufficiently slow for further processing by control computer 27.

Control computer 27 further processes signals on buss 26 to derive control signals output on buss 28 and calculates pseudo-range and integrated carrier phase data. Broadcast satellite data are also recovered by control computer 27, and all such data are output on buss 29. Because of the slow output rate, control computer 27 can be a low cost microprocessor such as the MC68HC11, with related memory. Control computer 27 provides control signals on buss 28 to digital correlator decimators 24, 25. Control computer 27 also has an additional input/output buss 29 which transfers receiver measured data to the navigation computer (not shown).

FIG. 2 is a detailed block diagram of GPS receiver 18 of FIG. 1, comprising antenna 20, antenna output terminals 21, pre-filter 31, busses 23, 32, 34, 36, 39, 42, 43, 45, 47, 49, 51, 53, 56, 57, 66, bandpass filter 35, L-band amplifiers 37, first mixer 63, first IF filter 44, first IF amplifier 64, second mixer 65, second IF amplifier 67, second IF filter 52, voltage regulator 62, level translator 68, and phase locked loop 69.

Phase locked loop 69 further comprises L-band VCO 70, first digital frequency divider 50, second digital frequency divider 54, phase-frequency detector (PFD) 58, loop filter 59, filter capacitor 61, and stable oscillator 55. L-band VCO 70 further comprises L-band oscillator 41 and tuning element 60.

FIG. 2 shows antenna output terminals 21 connected to pre-filter 31. In the present implementation, pre-filter 31 is a band pass filter providing out of band rejection to signals received by antenna 20. In the present implementation, pre-filter 31 is miniaturized and has a nominal 50 megaHertz band width. Pre-filter 31 output terminals 32 are connected to low noise amplifier 33.

In the preferred implementation, amplifier 33 is a monolithic microwave integrated circuit (MMIC) having a minimum gain of 22 dB and has output 34 connected to second miniaturized filter 35, providing additional out-of-band and first image frequency signal rejection. In the present embodiment, filter 35 has output 36 connected to RF integrated circuit (RFIC) 38. L-band input 36 is connected to amplifier 37.

In the present embodiment, amplifier 37 provides a nominal 23 dB of gain to received satellite signals. Amplifier output 39 is connected to first IF block 40 containing first mixer 63 and intermediate frequency (IF) amplifier 64 which together provide up to an additional 32 dB of gain.

The first local oscillator (LO) injection frequency is provided on lead 42 to first mixer 63 by L-band voltage controlled oscillator (VCO) 70. Mixer output 43 is connected to first IF filter 44. First IF filter 44 has output 45 connected to first IF amplifier 64. The gain of amplifier 64 may be adjusted via GAIN ADJ. lead 46. First IF amplifier 64 operates at a nominal frequency of 47.76 megaHertz with output 47 connected to second IF block 48, containing second mixer 65 and second IF amplifier 67. The second LO injection frequency is supplied to second mixer 65 by first digital frequency divider 50 via lead 49.

In the present embodiment of the invention, this second LO frequency is nominally 38.1915 megaHertz.

The frequency of the signal on output 66 of second mixer 65 will be the difference between the signal frequencies on leads 47, 49. The signal on lead 66 is amplified by second IF amplifier 67 and then connected to second IF filter 52 via lead 51. Filter 52 is an anti-aliasing filter which further rejects out-of-band signals, prior to digitization by digital correlator decimators 24, 25 of FIG. 1. Note that the nominal output frequency of second IF amplifier 67 of FIG. 2 is approximately one fourth of the sampling frequency appearing on lead 53, providing a simple means of obtaining the I and Q signals, as explained above.

All LO injection frequencies are derived from L-band voltage controlled oscillator (VCO) 70. The signal on lead 42 is the output of L-band oscillator 41. The frequency of output 42 is divided by forty by first digital frequency divider 50, a high-speed digital frequency divider, providing the second mixer LO signal on lead 49. Translator 68 buffers and level shifts the signal on lead 49 to establish logic levels on TTL output lead 53 suitable for driving timing circuits of digital correlator decimators 24, 25 of FIG. 1. The signal on lead 49 of FIG. 2 is also used to drive second digital frequency divider 54, providing a signal on lead 56 that is one half the frequency of that on lead 49.

During normal operation, the phase and frequency on lead 56 will be equal to that of stable oscillator 55. Output 56 of second digital frequency divider 54 and output 57 of stable oscillator 55 are connected to PFD 58. PFD 58 comprises a combined digital PFD that may be similar to that of integrated circuit MC12540. The output of PFD 58 in combination with loop filter 59 provide a frequency and phase correcting control voltage to VCO 70 to lock its frequency and phase, as scaled by first and second digital frequency dividers 50, 54 to that of stable oscillator 55, causing L-band oscillator 41 to generate a frequency precisely 80 times that of stable oscillator 55.

Those skilled in the art will recognize that the combination of VCO 70, first and second digital frequency dividers 50, 54, PFD 58, loop filter 59 including offchip filter capacitor 61, and stable oscillator 55 form phase locked loop 69 that is simple and uses elements fabricated with silicon integrated circuit technology. One knowledgeable in design of VCOs will appreciate the inclusion of voltage regulator 62, used to regulate and filter the voltage applied to VCO 70. Phase locked loop 69 is fixed frequency and is required to generate only first LO frequency on lead 42, second LO frequency on lead 49 and the frequency on lead 56 equal to that of stable oscillator 55.

All other frequencies used by digital correlator decimators 24, 25 are derived from output 53 of translator 68 by digital frequency division, resulting in a simple, low cost frequency synthesizer implementation suitable for inclusion in a highly integrated GPS receiver.

Figure 3:
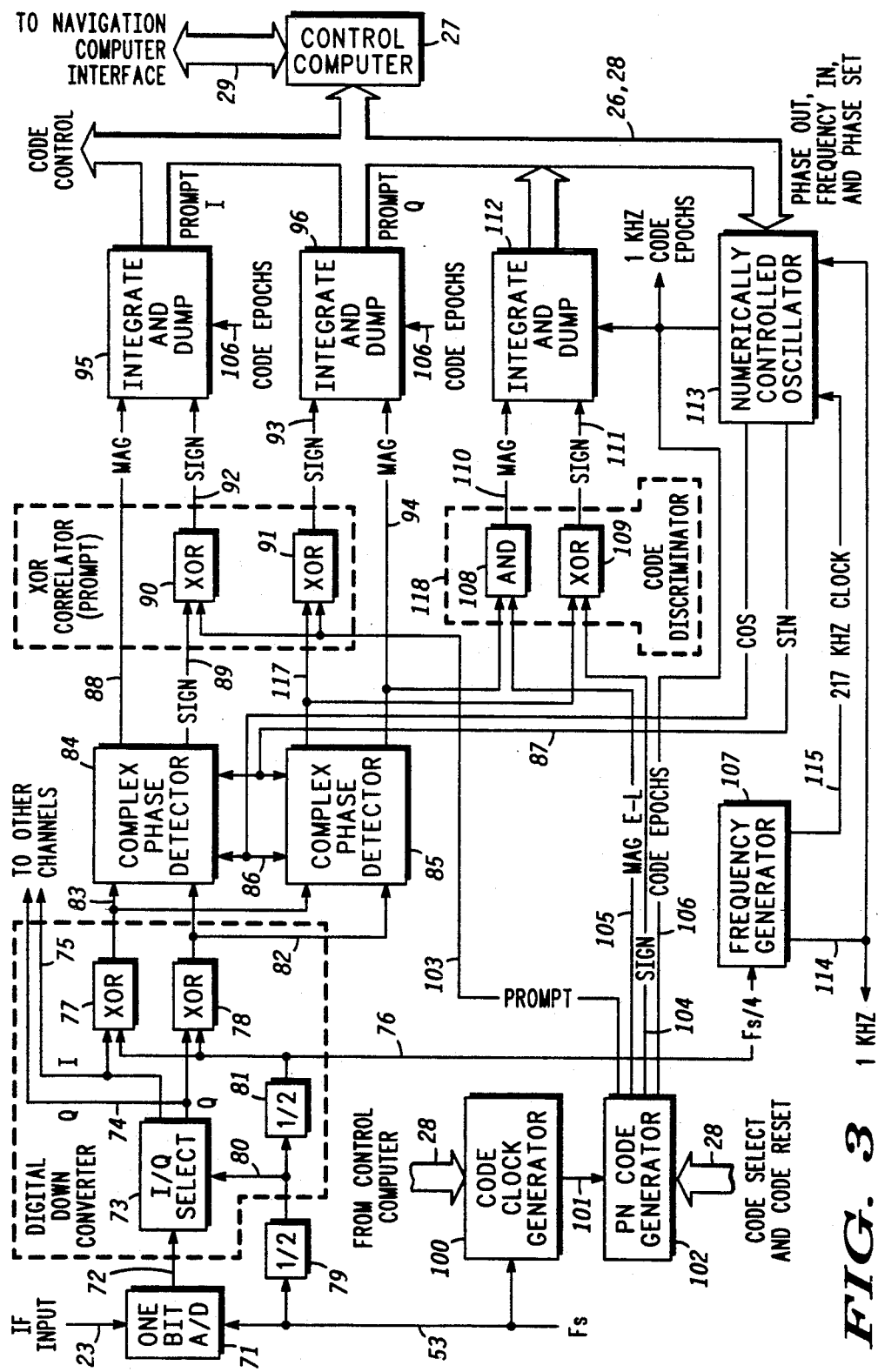
FIG. 3 is a block diagram of a single satellite signal channel of the digital correlator in accordance with the present invention.

FIG. 3 is a diagram of a single satellite signal channel circuit 116 in digital correlator decimators 24, 25, comprising second IF filter output buss 23, one-bit analog to digital converter (A/D) 71, leads 53, 72, 74, 75, 83, 86, 88, 89, 92, 93, 94, 101, 103, 104, 105, 106, 110, 111, 113, 114, 115, 117, busses 26, 28, 29, I/Q selector 73, exclusive or (XOR) gates 77, 78, 90, 91, divide by two circuits 79, 81, first and second complex phase detectors 84, 85, integrate and dump circuits 95, 96, 112, NCO 113, control computer 27, frequency generator 107, PN code generator 102, code clock generator 100, and code discriminator 118. Code discriminator 118 further comprises AND gate 108 and XOR gate 109.

Second IF filter 52 of FIG. 2 outputs an IF signal on buss 23 going to A/D 71 of FIG. 3. A/D 71 quantizes signals on buss 23 to either "ones" or "zeroes," depending on the signal polarity on buss 23.

GPS receiver 18 of FIG. 1 includes one integrated circuit having small form factor to provide two reception channels 24, 25, which receive the signals from A/D converter 71 on buss 23. Quantization is done at the sample rate determined by the signal frequency on lead 53 originating from level translator 68.

In the present implementation, this frequency is nominally 38.1915 megaHertz. Quantized signals are output on lead 72 to I/Q selector 73. I/Q selector 73, together with XOR gates 77, 78, function as a quadrature mixer, taking sampled signals from lead 72 to generate I and Q signals and down converting these signals to near zero frequency. Recalling that signals on buss 23 are at approximately one fourth the sampling frequency on lead 53, circuit operation can be briefly explained by considering what is normally done to generate quadrature signals.

Mathematically, the signal is multiplied separately by the local oscillator signal sine and cosine. Digital implementations use discrete sample times, so sample times can be thought of as occurring at 90° points of the LO signals, e.g., at peaks and zero crossings of the sine and cosine waves. The multiplications required are then simplified so that only one bit is needed. Further recalling that when the cosine wave is at its positive or negative peak, the sine wave is at zero, and when the sine wave is at its positive or negative peak, the cosine wave is at its zero, the required multiplication sequences are $+1, 0, -1, 0$ for the cosine wave and $0, +1, 0, -1$ for the sine wave. The digital processing illustrated by I/Q selector 73 together with XOR gates 77, 78 is one implementation of this procedure and is described in the following paragraph.

I/Q selector 73 takes two incoming samples on lead 72 and alternately switches them between leads 74, 75 in synchronism with the sample rate. This procedure results in I samples leading Q samples by a clock period. In addition to selection of I and Q signal samples, I/Q selector 73 aligns I and Q outputs in time by delaying I signals such that they are coincident with Q signals, after which they are applied to inputs of XOR gates 77, 78 respectively. The output rate on leads 74, 75 is nominally 19.09575 megaHertz, half of the sample rate.

Clock signals for the channel cell are derived from the level translated clock signal on lead 53. It is used directly to clock A/D converter 71 and is divided by two by digital divider 79 to obtain a nominal 19.09575 megaHertz signal on lead 80, used to drive I/Q selector 73 and second digital frequency divider 81.

Second digital frequency divider 81 outputs a timing signal that is one fourth of frequency $F_s$ on lead 53. Lead 76 is the output of second digital frequency divider 81 and is applied to XOR gates 77, 78 causing signals on leads 74, 75 to be alternately inverted and then non-inverted at outputs 82, 83, effectively multiplying signals on 74, 75 by either plus or minus one.

Remembering that input signals on buss 23 are at a nominal frequency of 9.5685 megaHertz and the nominal frequency on lead 76 is 9.547875 megaHertz, one skilled in the art will realize that the signals are digitally converted to a near zero difference frequency that is nominally 20.625 kiloHertz and further realize that signals on lead 82 will be 90° out of phase with those on lead 83. I/Q selector 73 could be constructed from readily available logic blocks such as "D" flip-flops and an inverter.

Signals on leads 82, 83 are coupled into first complex phase detector 84. First complex phase detector 84 is a one-bit digital implementation of a single side band phase comparator. The complex signal inputs are on leads 82, 83 while the complex reference frequency inputs are on leads 86, 87, that is, the one-bit cosine and sine outputs from numerically controlled oscillator (NCO) 113. First complex phase detector 84 output is the cosine of the difference between the frequencies of the complex inputs. An analog equivalent would have only a single output. However, the digital version, which can only output "ones" and "zeros," needs a second output to indicate polarity. The magnitude is shown on lead 88 and the sign on lead 89.

Second complex phase detector 85 performs the same function as first complex phase detector 84 except that connections 86, 87 are arranged to produce the sine of the frequency difference with the magnitude on lead 94 and the sign on lead 117. In normal operation while tracking a satellite signal, the signal frequency on leads 82, 83 and that of NCO 113 are the same so the average output from first complex phase detector 84 is a measure of the cosine of the phase angle difference between the down converted satellite signals and NCO 113. Also, the average output of second complex phase detector 85 is a measure of the sine of this phase angle. One skilled in the art will recognize that this type of phase detector could be constructed from common logic blocks such as XOR gates and inverters.

The processing described up to this point has not yet demodulated the pseudo-random noise (PN) code from the received signal. PN code modulation is the GPS system feature that allows separation of one satellite signal from the other, and is sometimes referred to as code division multiple access (CDMA).

In addition, this provides a way of making pseudo range measurements. The demodulation process reverses the modulation process used by the satellite. At the satellite, modulation is applied to the carrier by multiplying the carrier by either a plus or minus one, depending on the modulating PN code generator output state. The demodulation process is accomplished in GPS receiver 18 of FIG. 1 by generating a code identical to that used by the satellite and providing a method for changing its position relative to the receiver clock via a control loop.

In the present implementation, codes are generated by PN code generator 102 of FIG. 3. A code matching that of the satellite to be tracked is selected via code control buss 28 connected to PN code generator 102, which is clocked via lead 101. Code clock generator 100 nominally divides by 3/112 in order to obtain a 1.023 megaHertz CA code clock.

In order to correlate the code on the selected satellite signal, it is necessary for the code clock phase on lead 101 to be adjustable to allow time synchronization/alignment with the received code, whose time of arrival is variable, and code generated by PN code generator 102. In the present implementation, code phase is adjusted by control computer 27 via control buss 28.

PN code generator 102 has four outputs, leads 103, 104, 105, 106, as discussed below. The signal on lead 103 is referred to as the "prompt" (on time) code. The signal on lead 104 is referred to as the "late" code. It is the same as the prompt code on lead 103 except that it is delayed by one half of the code clock period on lead 101. An "early" code, internal to PN code generator 102, is the same as the prompt code, except it occurs one half of a code clock cycle earlier.

In other words, the early and late codes are one code clock cycle ("one chip") apart and the prompt code ideally is half way between them. The early and late codes are differenced with the difference magnitude appearing on lead 105. The difference sign appears on lead 104. The late code can be used to determine the sign. Magnitude output 105 and sign output 104 are applied to code discriminator 118.

When tracking a satellite, the prompt code on lead 103 is in time alignment with the selected satellite signals appearing on leads 88, 89, 94, 117. Prompt signal output 103 is connected to code inputs of XOR gates 90, 91. Polarity bits from phase detectors 84, 85 are connected to signal inputs of XOR gates 90, 91 via leads 89, 117.

Those skilled in the art will recognize that XOR gates 90, 91 provide a simple means for multiplying signals 89, 117 by plus or minus 1 as determined by the prompt code on lead 103. When the prompt code and that modulated on the received signal are time aligned, code correlation occurs, demodulating the PN code from the carrier spectral spreading and signal. Correlated outputs on leads 92, 93 determine the polarity (sign) of signal magnitudes on leads 88, 94.

Maintaining code alignment requires a method for determining the degree of time misalignment. This is accomplished by using signals on leads 117, 94, 104, 105 in conjunction with gates 108, 109 of code discriminator 118. AND gate 108 output provides the code position error magnitude and XOR gate 109 output provides its polarity.

The technique of subtracting early and late codes prior to code discriminator correlation has been described by R. A. Yost and R. W. Boyd in "IEEE Transactions on Communications," Vol. COM-30, No. 5, May 1982. One skilled in the art will recognize that using this approach eliminates need for separate carrier phase detectors and need for individual integrate and dump circuits for both the early and late codes in order to implement the code discriminator function.

The code epoch pulses occurring when the code states are all logical "ones" are available on lead 106. PN codes used by the GPS satellites are defined in Department of Defense Global Positioning System interface control documents such as "Navstar GPS Space Segment/Navigation User Interfaces," ICD-GPS-200.

Although the signal has been translated to near zero frequency and the signal despread by the phase detection and correlation process described above, distinguishing the signal from the noise requires additional filtering or integration.

In the present implementation, this is accomplished for the prompt I and Q signals and the code discriminator by integrate and dump circuits 95, 96. Polarity bits on leads 92, 93, 111 determine whether their respective integrators are incremented up or down whenever the magnitude is a "one." The integration process continues for a code period, nominally 1 millisecond, at which time the quantity in each integrator is read by control computer 27. Then integrators 95, 96, 112 are reset to zero by code epoch pulses on lead 106.

Since signal inputs 88, 93, 110 are still one bit wide, integrate and dump circuits could be implemented with up/down counters. The input data rate to integrators 95, 96, 112 is one half of frequency $F_s$ on lead 53 and the output rate is nominally 1 kiloHertz, a frequency low enough to be further processed by control computer 27.

Frequency generator 107 further divides timing signals on lead 76, providing a clocking signal for NCO 113 and a timing/interrupt signal on lead 114 for control computer 27. In the present implementation, signals on leads 115, 114 are at nominal frequencies of 217 and 1 kiloHertz, respectively.

NCO 113 provides an output frequency set by a digital frequency word from control computer 27, supplied via busses 26, 28. NCO operation is described by J. Tierney, et al., in "IEEE Transactions On Audio and Electroacoustics," Vol. AU-19, No.1, March 1971. NCO 113 uses one-bit approximations of sine and cosine functions, rather than the multi-bit digital-to-analog conversion described in the referenced paper. These one-bit outputs are available on leads 86, 87.

One skilled in the art will recognize that use of one-bit outputs greatly simplifies NCO design and the multiplication processes as explained in the discussion of first and second complex phase detectors 84, 85. Also, use of a 24 bit NCO 113 clocked at 217 kiloHertz, provides frequency resolution of 0.013 Hertz.

Implementing NCO 113 as described herein is easily accomplished using available integrated circuit technology. Additional digital interfaces are provided to control NCO 113 frequency and to preset NCO 113 phase via busses 26, 28, and to read phase to a fraction of a cycle. The blocks that interface with control computer 27 all contain address decoders, function select, and data latches as required for a given interface.

Figure 4A:
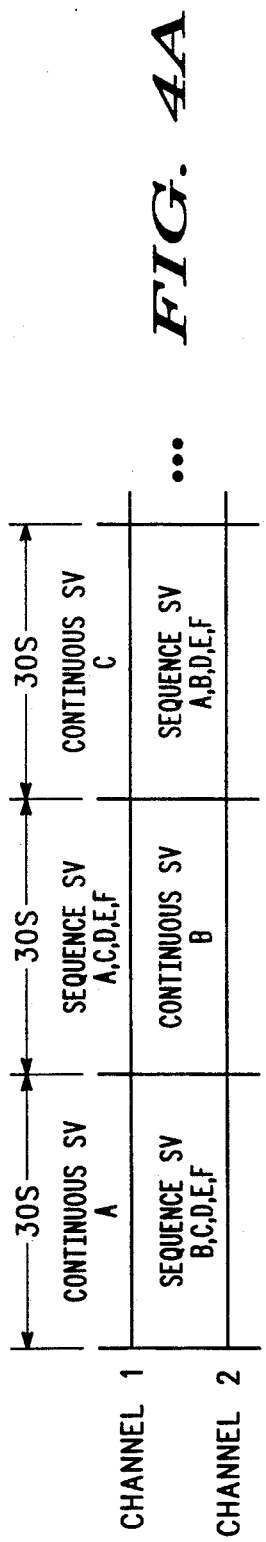
FIG. 4A is a timing diagram illustrating the inter-channel switching employed to achieve continuous and sequenced operation in accordance with the present invention.

FIGS. 4A, B, C are timing diagrams illustrating the switching employed for a particular satellite configuration to achieve continuous and sequenced operation in a GPS receiver having only two channels in accordance with the present invention.

FIG. 4A is a timing diagram illustrating the interchannel switching employed to achieve continuous and sequenced operation in accordance with the present invention. In the first thirty second (or longer) interval, represented at the left of FIG. 4A, a channel, for example first GPS receiver channel 24 of FIG. 1, is depicted as operating to continuously decode the signal from a particular satellite, for example, satellite signal A of FIG. 4A. First GPS receiver channel 24 of FIG. 1 also decodes the 50 BPS data message from satellite A, describing clock correction parameters, ephemeris data, and also providing information about other satellites in the constellation. First GPS receiver channel 24 also makes range measurements on satellite A, providing pseudo-range data which are used in calculating position. Second GPS receiver channel 25 of sequences through the other 5 satellite signals B-F of this particular satellite group, making range measurements on all five of these signals.

Following decoding the data message from satellite A, first GPS receiver channel 24 of FIG. 1 is switched into the sequencing mode and second receiver channel 25 is switched to the continuous mode, to receive the signal from satellite B and decode the satellite B data message, and makes pseudo-range measurements at the same time. First GPS receiver channel 24 sequences through satellites A, C, D, E, F during this time, making range measurements on these five signals.

At the end of decoding the satellite B data message, first and second GPS receiver channels 24, 25 again interchange reception modes, with first GPS receiver channel 24 operating in the continuous mode to decode the satellite C data message and making pseudo-range measurements, while second GPS receiver channel 25 sequences through the signals from satellites A, B, D, E, and F to obtain five other pseudo-range measurements.

Figure 4B:
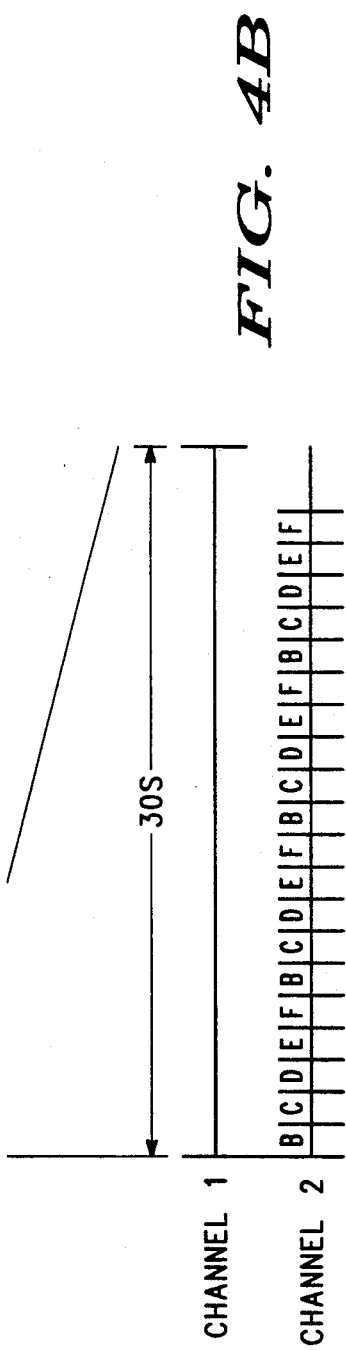
FIG. 4B is a timing diagram illustrating the intrachannel switching employed to achieve sequenced operation of one channel in accordance with the present invention.

FIG. 4B is a timing diagram illustrating the intrachannel switching employed to achieve sequenced operation of one channel in accordance with the present invention. The interval required to decode a satellite data message cannot be shorter than thirty seconds and is unlikely to exceed sixty seconds, allowing between thirty and sixty pseudo-range measurements to be made on each of the six satellite signals (five sequenced measurements by one channel and one continuous measurement by the other channel) during each cycle of continuous operation of the other channel.

Figure 4C:
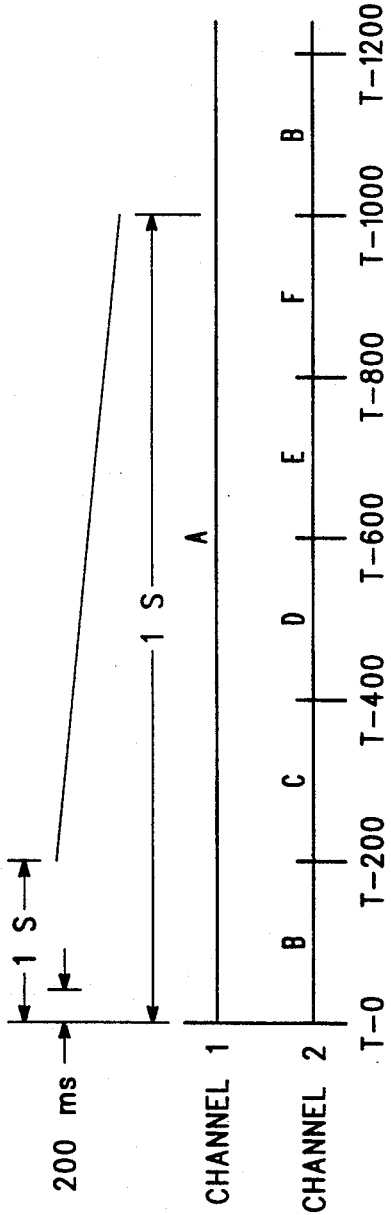
FIG. 4C is a timing diagram illustrating in detail the intrachannel switching employed to achieve sequenced operation of one channel in accordance with the present invention.

FIG. 4C is a timing diagram illustrating in detail the intrachannel switching employed to achieve sequenced operation of one channel in accordance with the present invention. In this particular implementation, the sequencing channel is shown to dwell on each satellite signal for 200 milliseconds.

When the first sequenced signal (from satellite B), observed from t=0 to t=200 milliseconds, is reacquired at t=1 second, frequency instabilities in receiver 18 of FIG. 1 can be computed and used to compensate receiver 18 to maintain locking. This is done by using Doppler shift due to relative motion between receiver 18 and the satellite, measured during the 0 to 200 millisecond observation interval, as a first estimate of the Doppler shift for the next 200 millisecond observation interval of FIG. 4C. This estimate allows second GPS receiver channel 25 of FIG. 1 to re-lock onto the signal from satellite B, if this estimate places the estimated signal frequency within the loop bandwidth.

This technique works well, unless the receiver local oscillator shifts by more than the tracking loop bandwidth during the 800 milliseconds of "off"-time. This implementation provides a means of compensating for local oscillator frequency shifts occurring during the sequencing off time by using Doppler information sampled from the continuous tracking channel.

As an example of how this works, consider the timing of observation of the signal from satellite B as shown in FIG. 4C. The implementation is such that the Doppler frequency shift as observed on the signal from satellite B is stored in memory by control computer 27 of FIG. 3 at t=200 milliseconds ($F_{B200}$), so that the signal from satellite B can be re-acquired at t=1000 milliseconds. The implementation also stores the Doppler frequency shift of the signal from satellite A, which is being continuously tracked, at t=200 milliseconds ($F_{A200}$). At t=1000 milliseconds, control computer 27 again samples the Doppler frequency shift of the signal from satellite A ($F_{A1000}$). Thus, control computer 27 provides a better estimate of the Doppler frequency shift of the signal from satellite B at t=1000 milliseconds by use of the following formula:

$$F_{B1000(EST)} = F_{B200} + (F_{A1000} - F_{A200}),$$

where the subscript EST denotes estimate. If the receiver local oscillator frequency shifts between t=200 milliseconds and t=1000 milliseconds, the amount of the frequency shift will be contained in the difference $(F_{A1000} - F_{A200})$. Consequently, this difference is used by control computer 27 to compensate for local oscillator frequency shifts during all off-time tracking intervals. This frequency shift estimation technique thus aids in re-acquisition of a given satellite signal.

Figure 5:
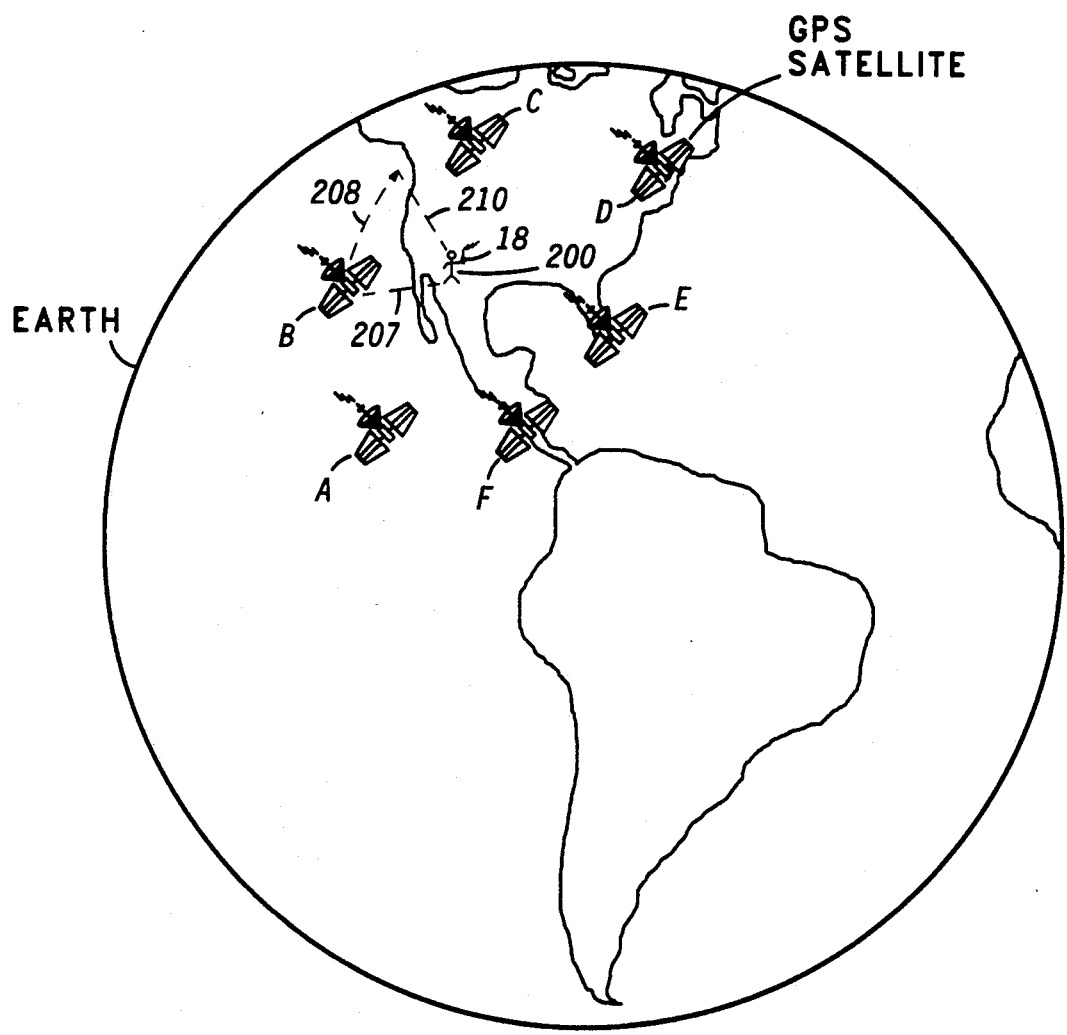
FIG. 5 is a diagram of Global Positioning System (GPS) satellites in relation to a user in accordance with the present invention.

Referring to FIG. 5, a diagram of a GPS satellite configuration about the Earth is shown. User 200 holds two channel GPS receiver 18 of FIG. 5 in accordance with the present invention. Two channel GPS receiver 18 tracks six GPS satellites A through F, for example. These satellites must all be within line of sight of user 200. Since only two channels 24, 25 of FIG. 1 are available to track satellites A-F, channels 24, 25 must be time shared among six satellite signals.

In the present invention, one of channels 24, 25 tracks a particular satellite signal for a thirty second interval. The other of channels 24, 25 tracks the other five satellites on a time sequenced basis.

After thirty seconds of tracking satellite A continuously on one of channels 24, 25 and satellites B-F on the other sequenced channel, the second of channels 24, 25 then tracks satellite B continuously for the next thirty seconds and the first of channels 24, 25 tracks satellites A and C-F on a sequenced basis. On the following thirty second tracking cycle, the one of channels 24, 25 continuously tracks satellite C and the other of channels 24, 25 sequentially tracks satellites A, B and D-F, etc.

Thus each of channels 24, 25 tracks each of five satellites for 200 milliseconds, while the other of channels 24, 25 continuously tracks one satellite before exchanging roles between channels 24, 25. There are 800 milliseconds from the end of measurement of a given sequenced satellite signal to the time the same satellite signal is re-acquired. Further, the more accurate the tracking information, the more accurately the position of user 200 is determined.

Satellite A is tracked by first GPS receiver channel 24 of FIG. 1. Satellites B through F are sequentially tracked by second GPS receiver channel 25. Satellite B is the first of five satellites which second GPS receiver channel 25 tracks on a time sequenced basis. As shown in FIG. 5, satellite B is at distance 207 from user 200 for one tracking cycle. As satellites C-F are tracked for 800 milliseconds, satellite B moves relative to user 200 along path 208.

When first GPS receiver channel 24 of FIG. 1 is set to continuously track satellite B of FIG. 5, satellite B has position with respect to user 200 at distance 210. First GPS receiver channel 24 of FIG. 1 must rapidly synchronize with signals from satellite B of FIG. 5 in order to gather pseudo-range information. Therefore, the new satellite B position and the Doppler effect must be estimated in order to allow rapid synchronization of first GPS receiver channel 24 of FIG. 1 to receive accurate positional information so that user 200 (FIG. 5) position may be accurately determined.

Figure 6:
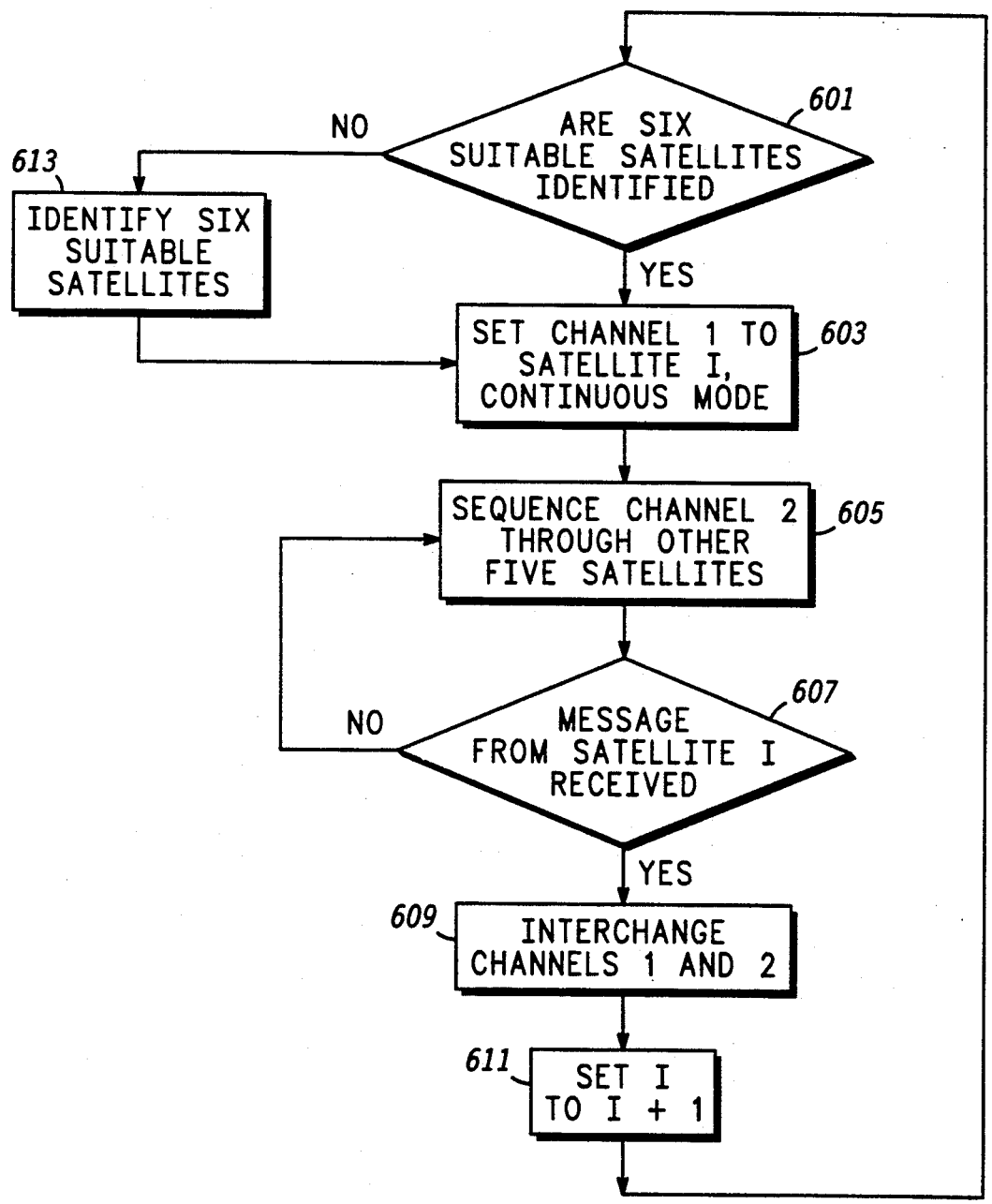
FIG. 6 is a flow chart illustrating the method of the present invention.

FIG. 6 is a flow chart illustrating the method of the present invention. Initially, six suitable satellites A-F of FIG. 5 are identified from those satellites which are above the user's 200 horizon, as represented by step 601 of FIG. 6.

One of channels 24, 25 of FIG. 1 is designated to initially operate in the continuous mode to decode the message from one of the six satellites, as shown in step 603, with the other of channels 24, 25 set to sequence through the other five satellite signals to obtain pseudo-range data, step 605. In step 607, the receiver determines that the continuously receiving channel has fully decoded the satellite data message, the receiver goes to step 609. In step 609, the channels interchange roles. Then, in step 611, a different satellite signal is chosen for continuous reception.

The receiver then returns to step 601 to determine that six suitable satellites are still available. If this is true, the receiver proceeds to step 603 and initiates message decoding from one of the group of signals which had been received in the sequenced mode.

This is followed again by step 605 wherein the five remaining signals provide pseudo-range data in the sequenced mode. If in step 601 it is determined that not all of the six suitable satellites previously identified are still available, the receiver proceeds to step 613 and then selects a suitable group of satellites.

This process is repeated to cycle all of the six satellite signals through the continuous reception mode while sequentially receiving pseudo-range data from the remaining satellite signals, thus providing simultaneous pseudo-range measurements and data from all six satellite signals. The overall process described by the steps of FIG. 6 is then iteratively repeated.

The advantages of this method and apparatus include the simplified receiver architectures of multiplexing and sequencing receivers without the signal-to-noise degradation associated with multiplexing receivers. The advantages further include the continuous reception of satellite message and pseudo-range data.

This is in contrast to the interrupted reception of both satellite broadcast and pseudo-range data typical of sequencing and multiplexing receivers. The hardware complexity of continuous reception receivers employing four or more channels is avoided in the present invention.

Substantial size and weight advantages are realized through incorporation of both receiver channels into a single chip.

As can be seen from the above description, the present GPS digital receiver may be implemented with inexpensive parts and does not require high precision oscillators. Thus, this approach is suitable for low-cost, high production volume GPS receivers for a broad variety of user applications.

Although the preferred embodiment of the invention has been illustrated, and that form described in detail, it will be readily apparent to those skilled in the art that various modifications may be made therein without departing from the spirit of the invention or from the scope of the appended claims.

What is claimed is:

1. A method for operating a two channel digital global positioning system receiver for receiving coded satellite signals from each of a plurality of satellites, the signals exhibiting Doppler shifting, the method comprising the steps of:

continuously tracking by a first channel of the receiver a particular one of the satellites for receiving information included in the coded satellite signals; and sequentially tracking by a second channel of the receiver each of the plurality of satellites, except the one particular satellite, for receiving information included in the coded satellite signals.

2. A method for operating a two channel digital global positioning system receiver as claimed in claim 1, wherein the step of continuously tracking includes the step of continuously tracking one particular satellite for a predetermined time period.

3. A method for operating a two channel digital global positioning system receiver as claimed in claim 2, wherein the step of continuously tracking for a predetermined time period further includes the step of continuously tracking one particular satellite for a time period in the range of 30 to 60 seconds.

4. A method for operating a two channel digital global positioning system receiver as claimed in claim 2, wherein there is further included the step of selecting a satellite of the plurality of satellites for continuously tracking for the predetermined time period.

5. A method for operating a two channel digital global positioning system receiver as claimed in claim 4, wherein the step of selecting includes the step of changing the satellite to be continuously tracked to another satellite of the plurality for the predetermined time period.

6. A method for operating a two channel digital global positioning system receiver as claimed in claim 5, wherein there is further included the steps of:
switching the channel performing continuous tracking to the second channel;
switching the channel performing sequential tracking to the first channel;
continuously tracking by the second channel a next satellite for the predetermined time period in the range of 30 to 60 seconds; and
sequentially tracking by the first channel the plurality of satellites, except the next satellite for the predetermined time period in the range of 30 to 60 seconds.

7. A method for operating a two channel digital global positioning system receiver as claimed in claim 6, wherein the step of sequentially tracking includes the steps of:
tracking a satellite of the plurality of satellites, except the next satellite for a time period of approximately 200 milliseconds; and
iterating the step of tracking for each satellite of the plurality satellites, except the next satellite.

8. A method for operating a two channel digital global positioning system receiver as claimed in claim 6, wherein there is further included the steps of:
switching the channel performing continuous tracking to the first channel;
switching the channel performing sequential tracking to the second channel;
continuously tracking by the first channel a next satellite for the predetermined time period in the range of 30 to 60 seconds; and
sequentially tracking by the second channel the plurality of satellites, except the next satellite for the predetermined time period in the range of 30 to 60 seconds.

9. A method for operating a two channel digital global positioning system receiver as claimed in claim 8, wherein the step of sequentially tracking includes the steps of:
tracking a satellite of the plurality of satellites, except the next satellite for a time period of approximately 200 milliseconds; and
iterating the step of tracking for each satellite of the plurality satellites, except the next satellite.

10. A method for operating a two channel digital global positioning system receiver as claimed in claim 8, wherein there is further included the step of iterating for successive 30 to 60 second time periods the steps of:
switching the channel performing continuous tracking;
switching the channel performing sequential tracking;
continuously tracking by the second channel;
sequentially tracking by the first channel;
switching the channel performing continuous tracking;
switching the channel performing sequential tracking;
continuously tracking by the first channel; and
sequentially tracking by the second channel.

11. A method for operating a two channel digital global positioning system receiver as claimed in claim 1, wherein there is further included the step of determining whether a sufficient number of satellites are identified for tracking by the receiver.

12. A method for operating a two channel digital global positioning system receiver as claimed in claim 11, wherein the step of determining includes the steps of:
finding a satellite which provides the coded satellite signals;
initiating the steps of continuously tracking and sequentially tracking when at least 4 satellites have been found; and
iterating the steps of finding and initiating until at least 4 satellites which provide the coded satellite signals are found.

13. A method for operating a two channel digital global positioning system receiver as claimed in claim 11, wherein the step of determining includes the steps of:
finding a satellite which provides the coded satellite signals;
initiating the steps of continuously tracking and sequentially tracking when at least 6 satellites have been found; and
iterating the steps of finding and initiating until at least 6 satellites which provide the coded satellite signals are found.

14. A method for operating a two channel digital global positioning system receiver as claimed in claim 6, wherein the step of continuously tracking by the second channel a next satellite includes the step of continuously tracking by the second channel a next sequential satellite of the plurality of satellites.

15. A method for operating a two channel digital global positioning system receiver as claimed in claim 8, wherein the step of continuously tracking by the first channel a next satellite includes the step of continuously tracking by the first channel a next sequential satellite of the plurality of satellites.

16. A two channel digital global positioning system receiver for receiving coded satellite signals from each of a selected plurality of satellites, the signals exhibiting Doppler shifting, the receiver comprising:
a first receiver channel means for continuously tracking a particular one of the plurality of satellites for receiving and decoding the coded satellite signals; and
a second receiver channel means for sequentially tracking each of the plurality of satellite, except the one particular satellite, the second receiver channel means for receiving information from the plurality of coded satellite signals except for the coded satellite signal of the one particular satellite.

17. A two channel digital global positioning system receiver as claimed in claim 16, wherein the first receiver channel means for continuously tracking the particular one of the satellites includes means for determining when an entire satellite message has been decoded.

18. A two channel digital global positioning system receiver as claimed in claim 17, wherein there is further included control means for changing the satellite to be continuously tracked to another satellite of the plurality when it is determined that the entire satellite message has been decoded from the one particular satellite.

19. A two channel digital global positioning system receiver as claimed in claim 18, wherein there is further included:
    means for switching the first receiver channel means for performing continuous tracking to the second receiver channel means; and
    means for switching the second receiver channel means for performing sequential tracking to the first receiver channel means.

20. A two channel digital global positioning system receiver as claimed in claim 19, wherein the first or second receiver channel means receives pseudo-ranging information included in the coded satellite signals.

21. A two channel digital global positioning system receiver as claimed in claim 18, wherein there is further included:
    means for switching the receiver channel means performing continuous tracking;
    means for switching the receiver channel means performing sequential tracking;
    continuously tracking by the second receiver channel means;
    sequentially tracking by the first receiver channel means;
    means for switching the receiver channel means performing continuous tracking;
    means for switching the receiver channel means performing sequential tracking;
    continuously tracking by the first receiver channel means;
    sequentially tracking by the second receiver channel means;

22. A method for operating a two channel digital global positioning system receiver for receiving coded satellite signals from each of a plurality of satellites, the signals exhibiting Doppler shifting, the method comprising the steps of:
    continuously tracking by a first channel of the receiver a particular one of the satellites for receiving information included in the coded satellite signals; and
    sequentially tracking by a second channel of the receiver each of the plurality of satellites, except the one particular satellite, for receiving information included in the coded satellite signals;
    switching the channel performing continuous tracking;
    switching the channel performing sequential tracking;
    continuously tracking by the second channel;
    sequentially tracking by the first channel;
    switching the channel performing continuous tracking;
    switching the channel performing sequential tracking;
    continuously tracking by the first channel;
    sequentially tracking by the second channel; and
    iterating for successive 30 to 60 second time periods the steps of:
        switching the channel performing continuous tracking;
        switching the channel performing sequential tracking;
        continuously tracking by the second channel;
        sequentially tracking by the first channel;
        switching the channel performing continuous tracking;
        switching the channel performing sequential tracking;
        continuously tracking by the first channel; and
        sequentially tracking by the second channel.

* * * * *